UNITED STATES PATENT OFFICE.

CLAUS A. SPRECKELS AND CHARLES A. KERN, OF NEW YORK, N. Y., ASSIGNORS TO FEDERAL REFINING COMPANY, OF JERSEY CITY, NEW JERSEY, A CORPORATION OF NEW JERSEY.

PROCESS OF TREATING SUGAR-CRYSTALS.

SPECIFICATION forming part of Letters Patent No. 700,099, dated May 13, 1902.

Application filed November 19, 1901. Serial No. 82,827. (No specimens.)

*To all whom it may concern:*

Be it known that we, CLAUS A. SPRECKELS and CHARLES A. KERN, citizens of the United States, and residents of the borough of Manhattan, city and State of New York, have invented certain new and useful Improvements in Processes of Treating Sugar-Crystals, of which the following is a full and true description.

The object of this invention is to economically and quickly purify sugar-crystals.

The generic step of the invention, of which this is a specific form, is the subject of an application for a patent filed November 14, 1901, Serial No. 82,193.

The present invention has specific properties and advantages.

Our present invention consists of the process of purifying or refining sugar when in a crystalline form as distinguished from a mere solution, and in general terms may be described as practiced by mixing the crystallized sugar with a defecating or cleansing liquid which wholly or partly consists of a sulfonated fluid or sulfo-oleaginous body produced by the action of sulfuric acid upon bodies such as resin, rosin, oils, essential oils, fats, fatty oils, and fatty acids in such proportions that there is no injurious effect upon the sugar from the sulfuric acid and in such proportions that sulfonated bodies are produced which have greater affinity or absorbent properties for the earthy or metallic salts and for the invert sugar and the caramel ordinarily carried by the sugar-crystals than the adherent properties of such substances for the sugar itself, and then separating the cleansing bodies, carrying the absorbed impurities from the mass of sugar-crystals, and separating the coarser impurities and traces of the cleansing composition, if present, from the cleansed sugar.

We believe we are the first to discover the use of sulfonated or sulfo-oleaginous bodies, including the recognized sulfonic acids or materials containing the same, for the purpose of cleansing or purifying crystallized sugar or sugar-bearing material.

As an example of the way in which the sulfonated or sulfo-oleaginous cleansing or purifying liquids may be prepared for use we have stated in our prior application, No. 82,193, as follows: We mix sulfuric acid, preferably of 1.835 specific gravity, (66° Baumé,) or a mixture of acids containing sulfuric acid in the proportion of, say, fifty parts, by weight, of acid with one hundred parts, by weight, of one or more bodies, of which resinous bodies fats, fatty oils and fatty acids, and essential oils are examples. The sulfuric acid is added to the body gradually, so as to maintain a low temperature, and the mixture is allowed to stand for a few hours. The excess of acid is removed or neutralized either by the addition of alkali or by the addition of water and gravital separation. The proportion and strength of acid above suggested may be used in sulfonating each and every one of the substances hereinafter mentioned; but in the cases of essential oils, such as turpentine, it will be preferable to considerably increase the proportion of the oil to the sulfuric acid, even to the extent of doubling the same or more. The cleansing or defecating body produced is of course in all cases fluid. The proportion and strength of acid may, of course, be varied in well-known ways, it being borne in mind that the result is that the body when acted upon by the sulfuric acid and in the condition in which it is to be used will not contain sulfuric acid in any amount injurious to the sugar and will have an affinity or absorbent property for the impurities greater than the adherent properties of such impurities for the sugar itself.

The following are bodies which we have tested and found to act in the manner described, viz: colophonium, (rosin,) rosin-oil, olive-oil, castor-oil, cotton-seed oil, cocoanut-oil, linseed-oil, rape-oil, peanut-oil, lard, tallow, cod-liver oil, fish-oil, (menhaden-oil,) lard-oil, oleic acid, stearic acid, palmitic acid, butyric acid, oil of turpentine; but the substances above named are given as examples only of resinous, fatty, or oily bodies which when subjected to the action of sulfuric acid result in cleansers useful in carrying out our method.

Our invention also includes the employment of sulfonated bodies made by the subjection of mixtures of two or more of such resinous, fatty, or oily bodies to the action of sulfuric acid. We have obtained good results from a considerable number of such mixtures, of which the following may be cited as examples: first, rosin-oil, castor-oil, and oleic acid; second, castor-oil, cotton-seed oil, and oleic acid; third, lard and rosin-oil; fourth, rosin-oil, oleic acid, and oil of turpentine; fifth, tallow and oil of turpentine.

As most of the above-enumerated bodies are known as "oils," and as rosin is analogous to the fatty bodies for the purposes of our invention, and as the fats are solid oils, and as the fatty acids, as is well known, have oily or greasy characteristics, and as all of the above substances are acted upon by sulfuric acid in the manner described, and also when sulfonated act on sugar and its impurities in analogous and equivalent ways, we hereinafter include them all under the generic term "oleaginous" bodies, and when acted on by sulfuric acid in the manner described we term the derivatives "sulfo-oleaginous" bodies. All the derivative cleansing agents mentioned are properly included also under the term "sulfonated" bodies, whether properly and strictly called "oleaginous" or not. Many forms of sulfo-oleaginous bodies are well known in the arts for other purposes, and hence a more particular description of the methods of producing the same is not required.

The action of sulfuric acid upon the various resinous, fatty, or oily bodies, examples of which are above given, while not identical is sufficiently similar to class all of these bodies together in that they combine or become associated with the sulfuric acid in such a way as to form a sulfonic acid or other sulfo-oleaginous body and to produce a resulting substance or compound which does not contain sulfuric acid in a form which is harmful to sugar, but which compound has an affinity or absorbent quality for the mineral or earthy salts and for the invert sugar and the caramel, which are the impurities most generally associated with sugar, superior to the adherence of such impurities to the sugar itself.

The essential character of the substance is not altered if in the process of removing any free sulfuric acid the sulfonic acid or other sulfo-oleaginous body be acted on by alkalies to produce salts.

We understand that the chemical reaction by which sulfonic acid is produced is said to be that one group of hydroxyl (HO) of sulfuric acid is replaced by an organic group; but we do not limit ourselves to chemical formulæ, as in the case of many bodies these are obscure. Specific forms of our sulfonic-acid cleansers and the method of making the same are described and claimed in our pending application, filed November 19, 1901, Serial No. 82,825, for Letters Patent of the United States.

Our new method may be employed for the purpose of purifying any material containing sugar-crystals—such as crude sugar or brown sugar, for example. The mixture of the cleanser and the mass containing sugar-crystals is stirred thoroughly in order to bring the cleanser into intimate contact with all of the impurities of the sugar. The amount of cleanser used may be varied to suit the different qualities of the material being treated; but preferably we find it advisable to use enough to make the mass semifluid. In all cases there should be more than enough to absorb out the impurities. As the cleanser has no injurious effect upon the sugar-crystals, the quantity of cleanser may be increased as desired. We afterward separate, preferably mechanically, as by the use of a centrifugal machine, the cleanser and the impurities absorbed out by it from the mass, leaving a mass of purified sugar-crystals containing only slight, if any, traces of the composition used. The purified sugar-crystals, which contain slight traces of the cleanser used, together with solid impurities not absorbed out by the cleanser—such as sticks, stones, fibers, straws, &c.—may be afterward treated to remove the traces of the cleanser. The solid impurities, if any, should of course be removed in any desired or well-known way.

The separation of the cleanser and impurities may be carried out by dumping the mixture into a rapidly-whirling centrifugal separator having a perforated basket of fine mesh and subjecting the mixture to centrifugal action in this machine for, say, from one to five minutes until the crystallized mass is considered to be thoroughly dried.

The treatment of the material by the cleanser is preferably carried out without the application of heat, inasmuch as then there is no tendency to the formation of caramel or invert sugar during the treatment.

Our present invention, as distinguished from the generic step involved in the same, which is described and claimed in our United States Letters Patent No. 698,150, granted April 22, 1902, is based on the discovery by us that the sulfonated bodies of the class herein described are not solvents of sugar-crystals and are absorbents of or have such an affinity for the impurities usually found associated with such crystals that after being mixed with impure sugar the pure sugar may be separated out in a refined state (more or less complete) by subjection to centrifugal action.

The special advantages of our present process over many previous processes of treating sugar-bearing material containing sugar-crystals for purifying the same is that the necessity of first reducing the sugar to a state of solution is obviated and the unrefined or only partly refined sugar-crystals are treated directly and a pure product may be obtained without necessity of employing the usual bag-filtration and treatment with animal charcoal.

We are aware of the employment for washing or cleansing a mass containing crystalline sugar of alcohol or a saturated solution of sugar, and we are aware of the employment of a mixture of paraffin-oil and water. Our invention differs from the said processes, among other things, in that the material utilized for cleansing is a sulfonated non-solvent of sugar and has a greater affinity for the impurities, including invert sugar carried by the sugar or sugar-bearing material, than the adherent properties of such impurities for sugar itself. Its use also results in recovering in the refined state a much larger proportion of the sugar.

We desire it clearly understood that while we specify certain substances and mixtures thereof as producing the cleanser and results above described, yet we do not limit ourselves to the substances and mixtures specifically mentioned, as many other like bodies may be produced.

We claim—

1. The method or process of refining or purifying a mass of sugar-crystals, consisting in washing the mass with a sulfonated defecating or cleansing agent which is a non-solvent of sugar-crystals, and then separating the said agent together with the absorbed impurities, substantially as described.

2. The method or process of refining or purifying sugar-crystals, consisting in washing the mass with a sulfo-oleaginous body, and then separating the sulfo-oleaginous body together with the absorbed impurities, substantially as described.

3. The method or process of refining or purifying sugar-crystals, consisting in washing the mass with a sulfonic-acid body, and then separating from the mass the said sulfonic-acid body together with the absorbed impurities, substantially as described.

4. The method or process of refining or purifying a mass containing sugar-crystals, consisting in washing the mass with a defecating or cleansing agent containing a sulfonated derivative of a resinous body, and then separating from the mass the said defecating or cleansing liquid together with the absorbed impurities, substantially as described.

CLAUS A. SPRECKELS.
CHARLES A. KERN.

Witnesses:
WILLIAM W. COOK,
W. H. BERRIGAN, Jr.